US008499355B1

(12) United States Patent
Goncharov (10) Patent No.: US 8,499,355 B1
(45) Date of Patent: Jul. 30, 2013

(54) AUTHORIZATION SYSTEM HAVING A BLOOM FILTERED AUTHENTICATION LIST FOR FRAUD DETECTION

(75) Inventor: Sergey Goncharov, Rishon le Zion (IL)

(73) Assignee: EMC Corporation, Hopkinton, MA (US)

( * ) Notice: Subject to any disclaimer, the term of this patent is extended or adjusted under 35 U.S.C. 154(b) by 168 days.

(21) Appl. No.: 13/070,777

(22) Filed: Mar. 24, 2011

(51) Int. Cl.
*G06F 21/00* (2006.01)
(52) U.S. Cl.
USPC .............................................. 726/25
(58) Field of Classification Search
USPC ..................................... 726/22–26
See application file for complete search history.

(56) References Cited

U.S. PATENT DOCUMENTS

| 7,260,715 B1 * | 8/2007 | Pasieka | 713/158 |
| 7,769,967 B2 | 8/2010 | Zhu et al. | |
| 2009/0089869 A1 * | 4/2009 | Varghese | 726/7 |

OTHER PUBLICATIONS

"RSA eFraudNetwork: Sharing Information to Prevent Fraud," RSA, The Security Division of EMC, retrieved from http://www.rsa.com/node.aspx?id=3071 on Feb. 14, 2011.

* cited by examiner

*Primary Examiner* — Brandon Hoffman
*Assistant Examiner* — Anthony Brown
(74) *Attorney, Agent, or Firm* — BainwoodHuang (57) ABSTRACT

A risk engine device of an enterprise's authentication system is configured to apply a Bloom filter algorithm to a master authentication list from a database to generate the Bloom filtered authentication list. Once generated, the risk engine device stores the Bloom filtered authentication list as part of an associated cache memory. Because the Bloom filtered authentication list is smaller in size relative to the master authentication list, by utilizing the Bloom filtered authentication list, the risk engine device decouples the linear dependency between the master authentication list and cache memory consumption, thereby reducing the relatively excessive cache memory use found in conventional risk engines.

21 Claims, 3 Drawing Sheets

AUTHORIZATION SYSTEM HAVING A BLOOM FILTERED AUTHENTICATION LIST FOR FRAUD DETECTION

BACKGROUND

A typical corporate organization utilizes the Internet to communicate with customers and vendors, to conduct research, and to perform various other tasks. The organization also creates and maintains confidential and proprietary information, such as financial data, personal information, confidential documents, intellectual property, and customer lists as part of the usual course of business. Theft of proprietary information is one of the most costly security problems facing organizations today. For example, theft of financial data, customer lists, and intellectual property can impact revenues, increase legal costs, and erode long-term competitive advantages for an organization.

To minimize access to proprietary information associated with an organization's data storage system, certain organizations typically utilize user authorization systems. These authorization systems include predefined policies that assign a level of risk or risk score to a user or user device. The organizations in turn, utilize the risk score to either allow or deny the user from carrying out a given operation on a particular resource associated with the data storage system.

For example, conventional authorization systems, such as used by banking institutions, are configured to receive and cache eFraud Network (EFN) lists from an EFN server. Conventional EFN lists can include a list of stolen credit card numbers or a list of unsafe or risky Internet Protocol (IP) addresses. During operation, when the authorization system receives a resource request from a user device, such as a request to access a bank account, the authorization system compares a user device identifier, such as an IP address, associated with the resource request with entries in a corresponding EFN list. Based upon the results of the comparison, the authorization system can assign a risk score to the user device indicating a level of risk associated with allowing user device access to the requested resource. Based upon the risk score, the organizations can further allow or deny the user's request to access the resource based upon an associated, preconfigured policy.

SUMMARY

In a conventional authorization system, a database typically stores EFN lists and provides updated EFN lists to a risk engine component of the authorization system at substantially regular periods. For example, in the database, the EFN lists are saved as rule tables having a set of OR conditions connected to thousands of simple conditions (i.e., a simple condition per EFN list item). When a conventional authorization system receives an EFN list, a risk engine component of the authorization system typically caches the EFN list in cache memory such that every list item of the EFN list is represented as a data object in the memory.

Over time, EFN lists have reached relatively large sizes of hundreds of thousands of entries. In conventional authorization systems, with risk engine components caching all of the entries of the EFN lists and because memory consumption is linearly dependent on the size of the EFN lists, the EFN lists can consume most if not all of the cache memory of an associated risk engine component. During operation, this can lead to relatively long access times associated with conventional risk engine components. Alternately, an enterprise can increase the number of risk engine components utilized as part of its user authorization systems. However, the addition of additional components to the user authorization system can be costly.

By contrast to conventional authorization systems, embodiments of the present invention relate to authentication systems having a Bloom filtered authentication list for fraud detection. A risk engine device of an enterprise's authentication system is configured to apply a Bloom filter algorithm to a master authentication list from a database to generate the Bloom filtered authentication list. Once generated, the risk engine device stores the Bloom filtered authentication list as part of an associated cache memory. Because the Bloom filtered authentication list is significantly smaller in size relative to the master authentication list, by utilizing the Bloom filtered authentication list, the risk engine device decouples the linear dependency between the master authentication list and cache memory consumption, thereby reducing the relatively excessive cache memory use found in conventional risk engines.

During operation, when the risk engine device receives a resource request from a client device, the risk engine compares a client identifier associated with the resource request relative to the Bloom filtered authentication list. For example, assume the resource request includes a user's credit card number as the client identifier. The risk engine device compares the credit card number relative to the Bloom filtered authentication list rather than relative to the master authentication list. If the comparison generates a negative result, meaning that the credit card number is not present in the Bloom filtered authentication list, the negative result provided by the risk engine device has a one hundred percent certainty in being correct. If the comparison generates a positive result, meaning that the credit card number is present in the Bloom filtered authentication list, the positive result provided by the risk engine device can be considered a false positive within a pre-defined probability window. Accordingly, in response to a positive result, the risk engine is configured to compare the credit card number against the master authentication list to either confirm or deny the initial positive comparison result. With such a configuration, by utilizing the Bloom filtered authentication list, the risk engine device can minimize data access times during operation.

In one arrangement, an embodiment of the invention relates to a method for performing risk analysis. The method includes receiving, by a risk engine device, a resource request from a client device. The method includes comparing, by the risk engine device, identification information associated with the resource request with a Bloom filtered authentication list, Bloom filtered authentication list stored in memory associated with the risk engine device and the Bloom filtered authentication list being derived from a master authentication list. The method includes when detecting a lack of correspondence between the identification information and the Bloom filtered authentication list, refraining, by the risk engine device, from adjusting a risk score associated with the client device. The method includes when detecting a correspondence between the identification information and an entry in the Bloom filtered authentication list, comparing, by the risk engine device, the identification information with the master authentication list, the master authentication list stored in a database. The method includes when detecting a lack of correspondence between the identification information and the master authentication list, refraining, by the risk engine device, from adjusting the risk score associated with the client device. The method includes when detecting a correspondence between the identification information and an entry in the master authentication list, adjusting, by the risk engine device, the risk score associated with the client device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to authentication systems having a Bloom filtered authentication list for fraud detection. A risk engine device of an enterprise's authentication system is configured to apply a Bloom filter algorithm to a master authentication list from a database to generate the Bloom filtered authentication list. Once generated, the risk engine device stores the Bloom filtered authentication list as part of an associated cache memory. Because the Bloom filtered authentication list is smaller in size relative to the master authentication list, by utilizing the Bloom filtered authentication list, the risk engine device decouples the linear dependency between the master authentication list and cache memory consumption, thereby reducing the relatively excessive cache memory use found in conventional risk engines.

During operation, when the risk engine device receives a resource request from a client device, the risk engine compares a client identifier associated with the resource request relative to the Bloom filtered authentication list. For example, assume the resource request includes a user's credit card number as the client identifier. The risk engine device compares the credit card number relative to the Bloom filtered authentication list rather than relative to the master authentication list. If the comparison generates a negative result, that the credit card number is not present in the Bloom filtered authentication list, the negative result provided by the risk engine device has a one hundred percent certainty in being correct. If the comparison generates a positive result, that the credit card number is present in the Bloom filtered authentication list, the positive result provided by the risk engine device can be considered a false positive within a pre-defined probability window. Accordingly, in response to a positive result, the risk engine is configured to compare the credit card number against the master authentication list to either confirm or deny the initial positive comparison result. With such a configuration, by utilizing the Bloom filtered authentication list, the risk engine device can minimize data access times during operation.

Figure 1:
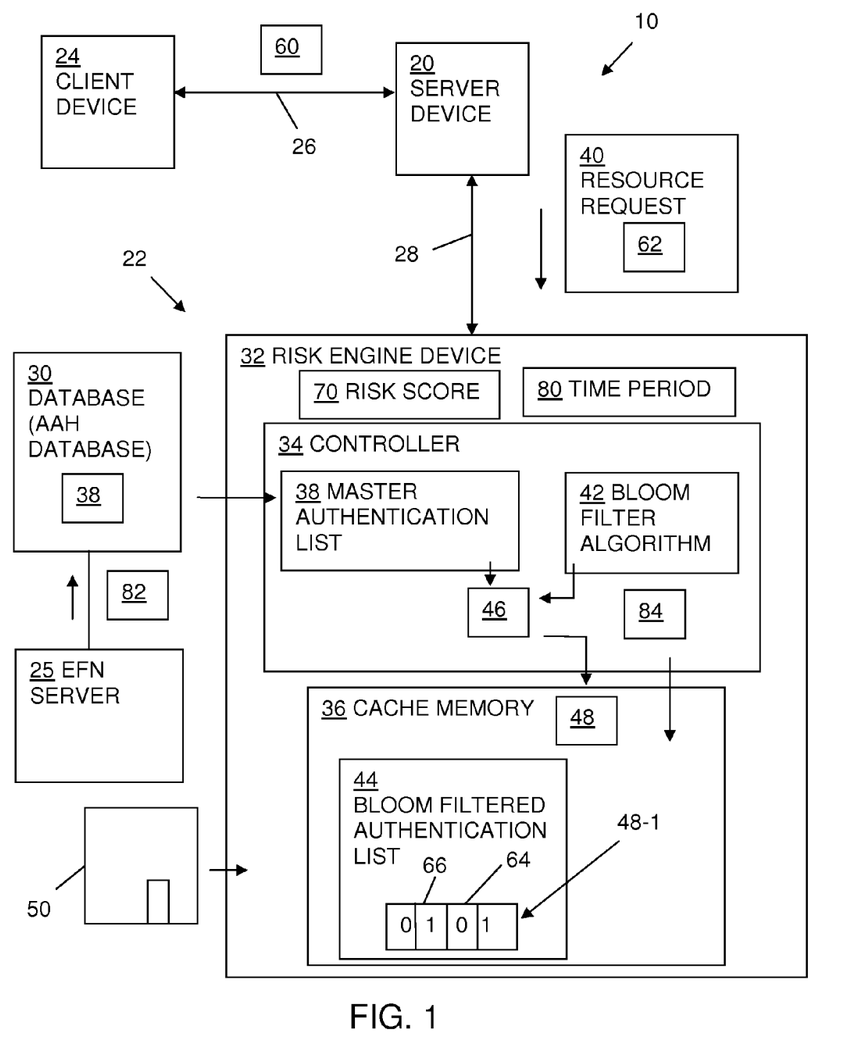
FIG. 1 illustrates a schematic representation of an enterprise network having an authorization system, according to one embodiment.

FIG. 1 illustrates an example arrangement of an enterprise network 10 having a server device 20 and an authorization system 22. The server device 20, such as a computerized device, is configured to receive requests from one or more client devices 24 for a variety of resources associated with the enterprise network 10. For example, in the case where the enterprise network 10 is configured to provide on-line or Internet banking services to the client device 24, the server device 20 is configured to receive requests for banking resources over an Internet connection. In the case where the enterprise network 10 is configured to provide credit card transaction services, the server device 20 is configured to receive credit card transaction requests from the client device 24 over the Internet connection 26.

The authorization system 22 is disposed in electronic communication with the server device 20, such as by a network connection 28. For example, the network connection 28 can be configured as a local area network (LAN) connection or a wide area network (WAN) connection. In use, the authorization system 22 is configured to provide a layer of protection between the enterprise network 10 and the client device 24. For example, when the enterprise network 10 includes an Adaptive Authentication Hosted (AAH) database, the authorization system 22, such as an AAH authentication system, is configured to protect banking resources stored by the enterprise network 10. In the case where the enterprise network 10 provides credit card transaction services, the authorization system 22 is configured to limit credit card transactions with clients or client devices 24 deemed to be risky.

In one arrangement, to provide such protection, the authorization system 22 includes a database 30 and a risk engine device 32 having a controller 34, such as a memory and a processor, and a cache memory 36. The database 30, such as an AAH database, is configured with a master authentication list 38, such as an eFraud Network (EFN) list. The master authentication list 38 includes transaction profiles associated with fraudulent financial information or fraudulent client devices, such as a list of stolen credit card numbers or a list of IP addresses associated with fraudulent users. The database 30 can receive the master authentication list 38, as well as periodically updated authentication lists, from an EFN server 25.

The risk engine device 32 is configured to utilize the master authentication list 38, in response to a resource request 40 received from the client device 24, to analyze a risk involved in interacting with the client device 24. Typically, the master authentication list 38 is typically relatively large in size and can encompass tens of megabytes of memory space within the cache memory 36 of the risk engine device 32. To minimize the consumption of cache memory space, the risk engine device 32 is configured to apply a Bloom filter algorithm 42 to the master authentication list 38 to generate a Bloom filtered authentication list 44 which consumes less cache memory 36 space than the master authentication list 38. The Bloom filtered authentication list 44 is a data structure configured to provide an indication that particular identification information associated with the resource request, such as an IP address associated with the client device 24 or a credit card number associated with the user of the client device 24 exists within the master authentication list 38 within a certain degree of certainty, as will be discussed below.

With continued reference to FIG. 1, in use, when generating the Bloom filtered authentication list 44, the risk engine device 32 first retrieves the master authentication list 38 from the database 30. For example, the risk engine device 32 accesses the database 30 and transfers the master authentication list 38, such as an EFN list, from the database 30 to the controller 34.

The risk engine device 32 then applies the Bloom filter algorithm 42 to the master authentication list 38 to generate the Bloom filtered authentication list 44. For example, as indicated above, the master authentication list 38 includes transaction profiles associated with fraudulent financial information or fraudulent client devices, such as a list of stolen credit card numbers or a list of IP addresses associated with fraudulent users. To process the master authentication list 38, the risk engine device 32 extracts an entry or transaction profile 46 from the master authentication list 38 and applies a hash function associated with the Bloom filter algorithm 42 to the entry 46 to generate a corresponding Bloom filter authentication list entry 48.

For example, assume the master authentication list 38 includes a list of stolen credit card numbers. Further assume that the risk engine device 32 extracts a first entry 46, stolen credit card number "12345," from the master authentication list 38. The risk engine device 32 applies the hash function to the string "12345" to generate a set of Bloom filter entry indices. By applying the hash function to each digit of the string, the risk engine device can generate a set of bits per digit and retain only a subset of the set of bits per digit, such as several bits per digit, to represent the entire string as a bit array. The resulting bit array is a Bloom filter authentication list entry 48 corresponding to the entry 36 "12345" in the master authentication list 38. After having generated the Bloom filter authentication list entry 48, the risk engine device 32 writes the Bloom filter authentication list entry 48 to the Bloom filtered authentication list 44 stored in cache memory 36. The risk engine device 32 repeats this procedure for each entry 46 in the master authentication list 38 and, once completed, discards the master authentication list 38 from the controller 34.

Once built, and as will be described below, the risk engine device 32 uses the Bloom filtered authentication list 44 to check if certain identification information contained in a resource request 40 is contained within the master authentication list 38. With respect to such use, the Bloom filtered authentication list 44 is configured to provide a negative answer with 100 percent certainty but can provide false positive results within a pre-defined level of certainty. For example, as will be described in detail below, if the risk engine device 32 does not find the identification information as being contained within the master authentication list 38 based upon a comparison with the Bloom filtered authentication list 44, the risk engine device 32 can rely on the negative answer as being absolutely correct. However, if the risk engine device 32 does find the identification information as being contained within the master authentication list 38 based upon a comparison with the Bloom filtered authentication list 44, because use of the Bloom filtered authentication list 44 can produce false positive results, the risk engine device 32 can only rely on the positive answer as being correct to a certain level of reliability (e.g., 95% certainty).

Use of the Bloom filter algorithm 42 allows the risk engine device 32 to represent a relatively large data set, such as the master authentication list 38 by a relatively smaller single bit set, here the Bloom filtered authentication list 44. For example, assume the master authentication list 38 includes one-hundred thousand (100K) entries 36, each entry 36 having a size of 100 bytes. In such a case, the master authentication list 38 would consume 10 megabytes (MB) of cache memory 36 of the risk engine device 32. By representing the master authentication list 38 as a Bloom filtered authentication list 44 having a false positive rate of 1% (i.e., a certainty rate of 99% with respect to positive results), the Bloom filtered authentication list 44 requires about 900 kilobytes of cache memory 36 of the risk engine device 32. Accordingly, because the size of Bloom filtered authentication list 44 is significantly smaller than the size of the master authentication list 38, generation and use of the Bloom filtered authentication list 44, rather than the master authentication list 38, reduces the amount of cache memory required for storage of the Bloom filtered authentication list 44 by a substantial amount.

The risk engine device 32 is further configured to perform risk analysis with respect to a resource request 40, as received from the client device 24, using the Bloom filtered authentication list 44. In one arrangement, the controller 34 stores a risk analysis application. The risk analysis application installs on the risk engine device 32 from a computer program product 50. In some arrangements, the computer program product 50 is available in a standard off-the-shelf form such as a shrink wrap package (e.g., CD-ROMs, diskettes, tapes, etc.). In other arrangements, the computer program product 50 is available in a different form, such downloadable online media. When performed on the controller 34 of the risk engine device 32, the risk analysis application causes the risk engine device 32 to utilize the Bloom filtered authentication list 44 to deny or confirm the presence of identification information, as associated with a client device resource request 40, in the master authentication list 38.

Figure 2:
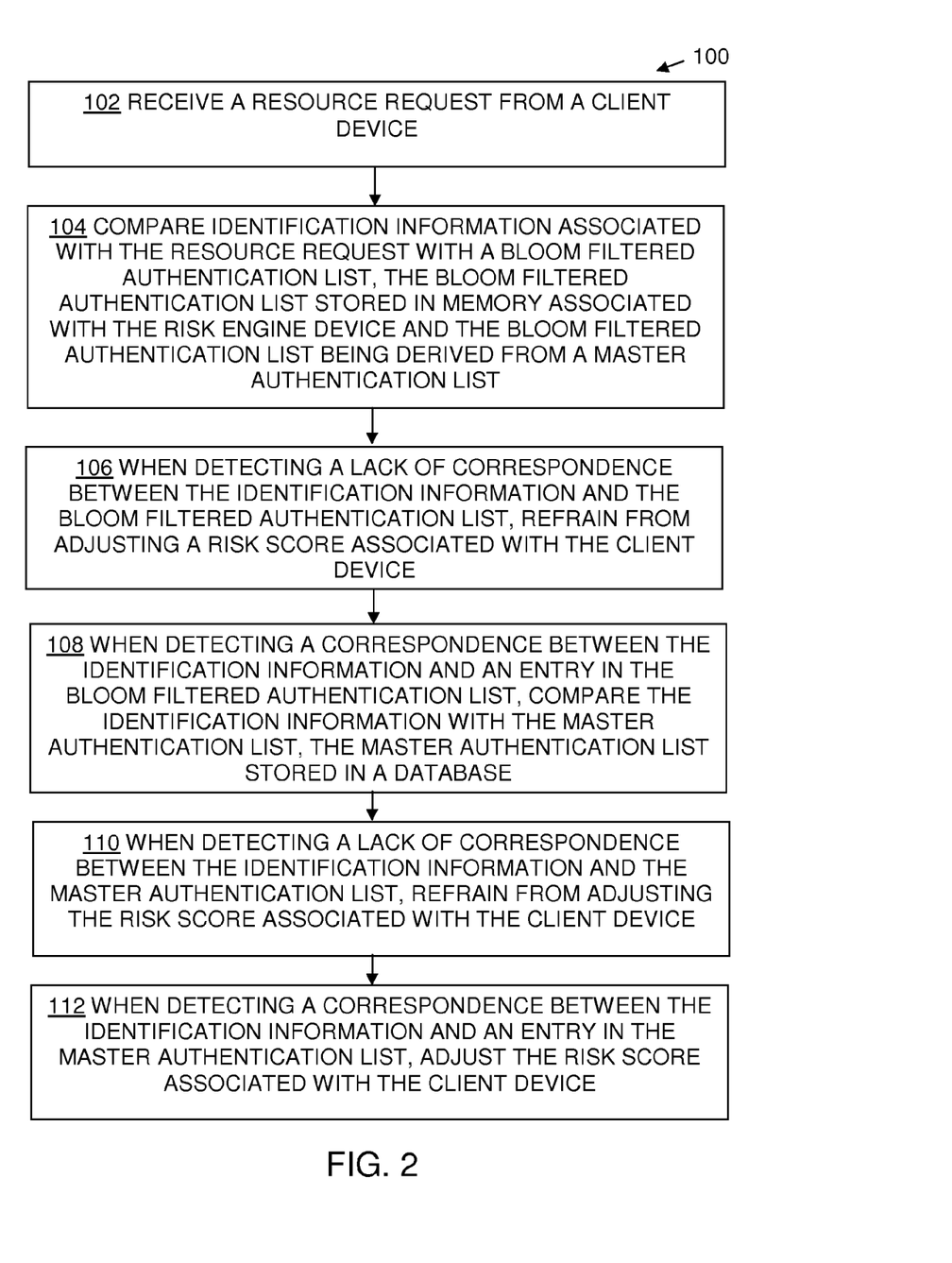
FIG. 2 is a flowchart that illustrates a procedure performed by a risk engine device of the authorization system of FIG. 1.

FIG. 2 is a flowchart 100 that illustrates a procedure performed by a risk engine device 32 of the authorization system 22 when performing a risk analysis with respect to a resource request 40.

In step 102, the risk engine device 32 receives a resource request 40 from a client device 24. For example, with reference to FIG. 1, assume the authorization system 22 forms part of an on-line banking system. A user at the client device 24 transmits a request 60, such as a username and password, to the server device 20 over the network connection 26 in an attempt to logon to an online banking account hosted by the server device 20. In response, the server device 20 retrieves identification information associated with the client device request 60 to initiate a risk analysis of the client device's request 60. For example, the server device 20 extracts an address associated with the client device 24 from the initial request 60, such as an IP address, and forwards the identification information 62 to the risk engine component 32 as part of the resource request 40.

Returning to FIG. 2, in step 104, the risk engine device 32 compares identification information 62 associated with the resource request 40 with a Bloom filtered authentication list 44, the Bloom filtered authentication list 44 stored in memory 36 associated with the risk engine device 32 and the Bloom filtered authentication list 44 being derived from a master authentication list 38. In one arrangement, with reference to FIG. 1, when the risk engine device receives the resource request 40, the risk engine device 32 extracts the identification information 62 from the resource request and applies a hash function to the identification information 62. For example, in the case where the identification information 62 is configured as the IP address of the client device 24, the risk engine device 32 can apply the hash function to the IP address to generate a set of bit positions to be checked against corresponding bit positions of each entry 48 in the Bloom filtered authentication list 44. The risk engine device 32 then compares the generated set of bit positions against corresponding bit positions of each entry 48 in the Bloom filtered authentication list 44.

Returning to FIG. 2, in step 108, when detecting a correspondence between the identification information 62 and an entry 48 in the Bloom filtered authentication list 44, the risk engine device 32 compares the identification information 62 with the master authentication list 38, the master authentication 38 list stored in a database 30. For example, with reference to FIG. 1, assume the result of the application of the hash function to the IP address results in directing the risk engine device 32 to check a value of a second bit position 66 of each entry 48 of the Bloom filtered authentication list 44. In the present example, the single entry 48-1 includes a value of one at the second bit position 66, indicating that the identification information 62 (i.e., the IP address of the client device 24) is present within the master authentication list 38. However, as noted above, use of the Bloom filtered authentication list 44 is configured to provide false positive results within a pre-defined level of certainty. Accordingly, if the Bloom filtered authentication list 44 were configured with a 5% uncertainty rate (i.e., a rate of 5 out of 100 positive results being false), there is a chance that the positive result generated by the comparison is erroneous. To eliminate the generation of a false positive result, the risk engine device 32 searches the master authentication list 38 in the database 30 and compares the identification information 62, in this case the IP address of the client device 24, with the entries in the master authentication list 38.

Returning to FIG. 2, in step 108, when detecting a correspondence between the identification information 62 and an entry 48 in the Bloom filtered authentication list 44, the risk engine device 32 compares the identification information 62 with the master authentication list 38, the master authentication 38 list stored in a database 30. For example, with reference to FIG. 1, assume the result of the application of the hash function to the IP address results in directing the risk engine device 32 to check a value of a second bit position 64 of each entry 48 of the Bloom filtered authentication list 44. In the present example, the single entry 48-1 includes a value of one at the second bit position 66, indicating that the identification information 62 (i.e., the IP address of the client device 24) is present within the master authentication list 38. However, as noted above, use of the Bloom filtered authentication list 44 is configured to provide false positive results within a pre-defined level of certainty. Accordingly, if the Bloom filtered authentication list 44 were configured with a 5% uncertainty rate (i.e., a rate of 5 out of 100 positive results being false), there is a chance that the positive result generated by the comparison is erroneous. To eliminate the generation of a false positive result, the risk engine device 32 searches the master authentication list 38 in the database 30 and compares the identification information 62, in this case the IP address of the client device 24, with the entries in the master authentication list 38.

Returning to FIG. 2, in step 110 when detecting a lack of correspondence between the identification information 62 and the master authentication list 38, the risk engine device 32 refrains from adjusting the risk score 70 associated with the client device 24. For example, the risk engine device 32 iterates through the master authentication list 38 and compares the client device's IP address 62 with IP address entries in the master authentication list 38. In the case where the risk engine device 32 does not detect the IP address 62 as being present in the master authentication list 38, the risk engine device 32 does not adjust a risk score 70 associated with the client device 24 based upon the identification information 62.

In step 112, when detecting a correspondence between the identification information 62 and an entry in the master authentication list, the risk engine device 32 adjusts the risk score 70 associated with the client device 24. For example, in the case where the risk engine device 32 detects the IP address 62 as being present in the master authentication list 38, the risk engine device 32 detects the client device 24 as being potentially dangerous or risky with respect to the exchange of financial data. Accordingly, as a result of such detection and in accordance with other factors, the risk engine device 32 adjusts the risk score 70 to indicate the client device 24 as being potentially dangerous and forwards the risk score to the server device 20 for further processing.

As indicated above, the size of the Bloom filtered authentication list 44 is significantly smaller than the size of the master authentication list 38. Accordingly, use of the Bloom filtered authentication list 44, rather than the master authentication list 38, by the risk engine device 32 reduces the amount of cache memory required for storage of the Bloom filtered authentication list 44 by a relatively large amount. It should be noted that while the risk engine device 32 is configured to access and search the master authentication list 38 after detecting a correspondence between the identification information 62 and an entry 48 in the Bloom filtered authentication list 44, such searching of the master authentication list 38 can be relatively infrequent. This is because vast majority of the requests 40 to the system 22 come from genuine users or genuine client devices 20, which do not have associated identification information 62 (IP addresses, credit card numbers, etc.) that exist in authentication lists 38, which are essentially black lists. Accordingly, by utilizing the Bloom filtered authentication list 44, the risk engine device 32 can minimize data access times during operation.

As indicated above, the Bloom filtered authentication list 44 is configured to provide false positive results, such as the existence of a correspondence between identification information 62 associated with a client device 24 and an entry 48 in the Bloom filtered authentication list 44, within a pre-defined level of certainty. For example, if the Bloom filtered authentication list 44 were configured with a 5% uncertainty rate, there is a chance that a positive result generated by a comparison between the identification information 62 and an entry 48 is erroneous at a rate of 5 out of 100. It should be noted that, in one arrangement, the risk engine device 32 can adjust the level of certainty associated with the Bloom filtered authentication list 44.

Figure 3:
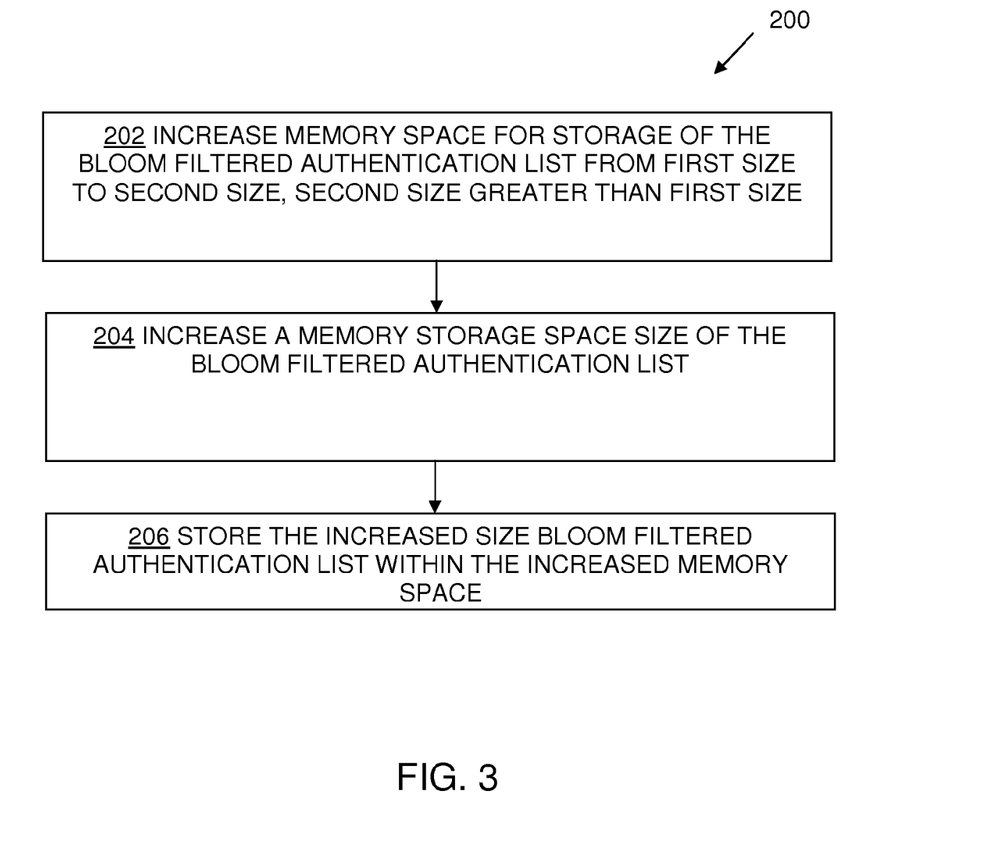
FIG. 3 is a flowchart that illustrates a procedure performed by a risk engine device of the authorization system of FIG. 1 when adjusting a level of certainty associated with a Bloom filtered authentication list of the authorization system.

For example, the risk engine device 32 can increase the level of certainty (i.e., decrease the uncertainty rate) associated with detecting a correspondence between the identification information 24 and an entry 48 in the Bloom filtered authentication list 44. FIG. 3 is a flowchart 200 that illustrates a procedure performed by a risk engine device 32 when adjusting a level of certainty associated with the Bloom filtered authentication list 44.

In step 202, the risk engine device 32 increases memory space 36 for storage of the Bloom filtered authentication list 44 from first size to second size, second size greater than first size. For example, assume that the cache memory 36 of the risk engine component 32 is configured with a total of 2 MB of storage space to store the Bloom filtered authentication list 44. In order to ensure that a relatively larger Bloom filtered authentication list 44 can be stored by the cache memory 36, the risk engine device 32 reconfigured the cache memory 36 to include greater than 2 MB of storage space. An increase in the storage space of the cache memory 36 allows the risk engine device 32 to store a larger and more precise Bloom filtered authentication list 44.

In step 204, the risk engine device increases a memory storage space size of the Bloom filtered authentication list 44. In one arrangement, when generating the Bloom filtered authentication list 44, the risk engine device 32 applies a hash function to a portion of an entry 46 of the master authentication list 38. As indicated above, for example, when a first entry 46 includes a stolen credit card number "12345," the risk engine device 32 applies the hash function to the string "12345" to generate a set of Bloom filter entry indices and retains only a subset of the set of bits per digit, such as ten bits per digit, to represent the entire string as a bit array. The resulting bit array is a Bloom filter authentication list entry 48 corresponding to the entry 36 "12345" in the master authentication list 38. In order to increase the precision and level of certainty associated with the Bloom filtered authentication list 44, the risk engine device 32 increases the number of bits retained per digit.

For example, when a first entry 46 includes a stolen credit card number "12345," to increase the level of certainty associated with a corresponding Bloom filtered authentication list 44, the risk engine device 32 can apply the hash function to the string "12345" to generate a set of Bloom filter entry indices and can retains a relatively large subset of the set of bits per digit, such as twenty bits per digit, to represent the entire string as a bit array. The risk engine device 32, in turn stores the increased size Bloom filtered authentication list within the increased memory space, as indicated in step 206.

Accordingly, by representing the master authentication list 38 as a Bloom filtered authentication list 44 having relatively large-sized Bloom filter authentication list entries 48, the risk engine device 32 increases the certainty and reduces the false positive rate when detecting a correspondence between identification information 62 associated with a client device and an entry 48 in the Bloom filtered authentication list 44.

In another arrangement, the risk engine device 32 can decrease the level of certainty associated with the correspondence between the identification information 62 and the Bloom filtered authentication list 44, by decreasing a memory storage space size of the Bloom filtered authentication list 44. As indicated above, for example, when a first entry 46 includes a stolen credit card number "12345," the risk engine device 32 applies the hash function to the string "12345" to generate a set of Bloom filter entry indices and retains only a subset of the set of bits per digit, such as ten bits per digit, to represent the entire string as a bit array. In order to decrease the precision and level of certainty associated with the Bloom filtered authentication list 44, the risk engine device 32 retains a relatively smaller subset of the set of bits per digit, such as five bits per digit, to represent the entire string as a bit array. This, in turn causes the risk engine device to generate a corresponding relatively smaller-sized Bloom filter authentication list entry 48 and a smaller-sized Bloom filtered authentication list 44 based on application of the hash function. With such a configuration, the risk engine device 32 can reduce the size of the Bloom filtered authentication list 44 when the amount of storage space available in the cache memory 36 is minimal.

While various embodiments of the invention have been particularly shown and described, it will be understood by those skilled in the art that various changes in form and details may be made therein without departing from the spirit and scope of the invention as defined by the appended claims.

For example, as indicated above, the risk engine device 32 is configured to retrieve the master authentication list 38 from the database 30 prior to generating the Bloom filtered authentication list 44. In certain cases, however, the database 30 can receive updated master authentication lists 82, such as EFN lists from an external server 25, such as an EFN server. These updated master authentication lists 82 can include new, additional authentication data entries, such as newly reported stolen credit card numbers or an updated list of IP addresses associated with fraudulent users. In one arrangement, in order to maintain the operation of the risk engine component 32 in accordance with the updated master authentication lists 82, the risk engine component 32 is configured to generate updated Bloom filtered master authentication lists over time.

For example, the risk engine device 32 is configured to retrieve the updated master authentication list 82 from the database 32 after expiration of a time period 80. For example, the risk engine device can be configured to retrieve the updated master authentication list 82 from the database once every fifteen minutes. The risk engine device 32 then applies the Bloom filter algorithm 42 to the updated master authentication 82 list to generate an updated Bloom filtered authentication list 84 and stores the updated Bloom filter authentication list 84 in cache memory 36. The risk engine device 32 utilizes the updated Bloom filtered authentication list 84 as a reference for comparison of identification information 62 received from an associated client device 24.

It should be noted that while the size of the master authentication list 38 can increase with additional updates received from the server 25, an increase in the size of the master authentication list 38 with subsequently received updated master authentication lists 82 does not require an enlarging of the Bloom filtered authentication list 84. The size of the Bloom filtered authentication list 84 can remain the same with the addition of entries 48 to the Bloom filtered authentication list 84, but at the cost of a growing uncertainty rate (i.e., an increase in the risk of false positives) over time.

What is claimed is:

1. A method for performing risk analysis, comprising:
   receiving, by a risk engine device, a resource request from a client device;
   comparing, by the risk engine device, identification information associated with the resource request with a Bloom filtered authentication list, the Bloom filtered authentication list stored in memory associated with the risk engine device and the Bloom filtered authentication list being derived from a master authentication list;
   when detecting a lack of correspondence between the identification information and the Bloom filtered authentication list, refraining, by the risk engine device, from adjusting a risk score associated with the client device;
   when detecting a correspondence between the identification information and an entry in the Bloom filtered authentication list, comparing, by the risk engine device, the identification information with the master authentication list, the master authentication list stored in a database;
   when detecting a lack of correspondence between the identification information and the master authentication list, refraining, by the risk engine device, from adjusting the risk score associated with the client device; and
   when detecting a correspondence between the identification information and an entry in the master authentication list, adjusting, by the risk engine device, the risk score associated with the client device.

2. The method of claim 1, comprising, prior to receiving the resource request from the client device:
   retrieving, by the risk engine device, the master authentication list from the database; and
   applying, by the risk engine device, a Bloom filter algorithm to the master authentication list to generate the Bloom filtered authentication list, the Bloom filtered authentication list requiring a smaller amount of memory storage space relative to the master authentication list.

3. The method of claim 2, comprising:
   retrieving, by the risk engine device, the master authentication list from the database after expiration of a time period;

applying, by the risk engine device, the Bloom filter algorithm to the master authentication list to generate an updated Bloom filtered authentication list; and storing, by the risk engine device, the updated Bloom filter authentication list in the memory associated with the risk engine device.

4. The method of claim 2, wherein applying the Bloom filter algorithm to the master authentication list to generate the Bloom filtered authentication list comprises:

extracting, by the risk engine device, an entry from the master authentication list;

applying, by the risk engine device, a hash function to the entry to generate a Bloom filter authentication list entry; and writing, by the risk engine device, the Bloom filter authentication list entry to the Bloom filter authentication list.

5. The method of claim 2, wherein retrieving the master authentication list from the database comprises retrieving, by the risk engine device, an eFraud Network (EFN) list from the database, the EFN list configured to include a transaction profile associated with a fraudulent client device.

6. The method of claim 2, wherein detecting the correspondence between the identification information and the master authentication list comprises detecting, by the risk engine device, the correspondence between the identification information and the master authentication list with a level of certainty, the level of certainty associated with a rate of falsely detecting that a correspondence exists between the identification information and an entry in the Bloom filtered authentication list.

7. The method of claim 6, comprising increasing, by the risk engine device, the level of certainty associated with the correspondence between the identification information and the Bloom filtered authentication list.

8. The method of claim 7, wherein increasing the level of certainty associated with the correspondence between the identification information and the Bloom filtered authentication list comprises:

increasing, by the risk engine device, memory space for storage of the Bloom filtered authentication list from first size to second size, second size greater than first size;

increasing, by the risk engine device, a memory storage space size of the Bloom filtered authentication list; and storing, by the risk engine device, the increased size Bloom filtered authentication list within the increased memory space.

9. The method of claim 6, comprising decreasing, by the risk engine device, the level of certainty associated with the correspondence between the identification information and the Bloom filtered authentication list.

10. The method of claim 9, wherein decreasing the level of certainty associated with the correspondence between the identification information and the Bloom filtered authentication list comprises decreasing, by the risk engine device, a memory storage space size of the Bloom filtered authentication list.

11. A risk engine device, comprising:

a communications interface; and a controller disposed in electrical communication with the communications interface, the controller configured to:

receive a resource request from a client device;

compare identification information associated with the resource request with a Bloom filtered authentication list, the Bloom filtered authentication list stored in memory associated with the risk engine device and the Bloom filtered authentication list being derived from a master authentication list;

when detecting a lack of correspondence between the identification information and the Bloom filtered authentication list, refrain from adjusting a risk score associated with the client device;

when detecting a correspondence between the identification information and an entry in the Bloom filtered authentication list, compare the identification information with the master authentication list, the master authentication list stored in a database;

when detecting a lack of correspondence between the identification information and the master authentication list, refrain from adjusting the risk score associated with the client device; and when detecting a correspondence between the identification information and an entry in the master authentication list, adjust the risk score associated with the client device.

12. The risk engine device of claim 10, wherein the controller is configured to, prior to receiving the resource request from the client device:

retrieve the master authentication list from the database; and apply a Bloom filter algorithm to the master authentication list to generate the Bloom filtered authentication list, the Bloom filtered authentication list requiring a smaller amount of memory storage space relative to the master authentication list.

13. The risk engine device of claim 11, wherein the controller is configured to:

retrieve the master authentication list from the database after expiration of a time period;

apply the Bloom filter algorithm to the master authentication list to generate an updated Bloom filtered authentication list; and store the updated Bloom filter authentication list in the memory associated with the risk engine device.

14. The risk engine device of claim 12, wherein when applying the Bloom filter algorithm to the master authentication list to generate the Bloom filtered authentication list, the controller is configured to:

extract an entry from the master authentication list;

apply a hash function to the entry to generate a Bloom filter authentication list entry; and write the Bloom filter authentication list entry to the Bloom filter authentication list.

15. The risk engine device of claim 12, wherein when retrieving the master authentication list from the database, the controller is configured to retrieve an eFraud Network (EFN) list from the database, the EFN list configured to include a transaction profile associated with a fraudulent client device.

16. The risk engine device of claim 12, wherein when detecting the correspondence between the identification information and the master authentication list, the controller is configured to detect the correspondence between the identification information and the master authentication list with a level of certainty, the level of certainty associated with a rate of falsely detecting that a correspondence exists between the identification information and an entry in the Bloom filtered authentication list.

17. The risk engine device of claim 16, wherein the controller is configured to increase the level of certainty associated with the correspondence between the identification information and the Bloom filtered authentication list.

18. The risk engine device of claim 17, wherein when increasing the level of certainty associated with the correspondence between the identification information and the Bloom filtered authentication list, the controller is configured to:
- increase memory space for storage of the Bloom filtered authentication list from first size to second size, second size greater than first size;
- increase a memory storage space size of the Bloom filtered authentication list; and
- store the increased size Bloom filtered authentication list within the increased memory space.

19. The risk engine device of claim 16, wherein the controller is configured to decrease the level of certainty associated with the correspondence between the identification information and the Bloom filtered authentication list.

20. A computer program product having a computer-readable medium including computer program logic encoded thereon that, when performed on a controller of risk engine device causes the risk engine device to:
- receive a resource request from a client device;
- compare identification information associated with the resource request with a Bloom filtered authentication list, the Bloom filtered authentication list stored in memory associated with the risk engine device and the Bloom filtered authentication list being derived from a master authentication list;
- when detecting a lack of correspondence between the identification information and the Bloom filtered authentication list, refrain from adjusting a risk score associated with the client device;
- when detecting a correspondence between the identification information and an entry in the Bloom filtered authentication list, compare the identification information with the master authentication list, the master authentication list stored in a database;
- when detecting a lack of correspondence between the identification information and the master authentication list, refrain from adjusting the risk score associated with the client device; and
- when detecting a correspondence between the identification information and an entry in the master authentication list, adjust the risk score associated with the client device.

21. The method for performing risk analysis of claim 1, wherein receiving the resource request from the client device includes:
- creating a Bloom filter to search the master authentication list for potential matches in the master authentication list with the identification information,
- applying the Bloom filter to the master authentication list to identify potential matches which form, at least a portion of, the Bloom filtered authentication list, and
- storing the Bloom filtered authentication list in a cache memory in the risk engine device.

* * * * *